United States Patent
Herrendoerfer et al.

(10) Patent No.: US 6,473,759 B1
(45) Date of Patent: Oct. 29, 2002

(54) METHOD AND SYSTEM FOR ACCESSING JAVA APPLICATIONS

(75) Inventors: Dirk Herrendoerfer, Sindelfingen; Robert Sulzmann, Holzgerlingen; Martin Welsch, Herrenberg, all of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/412,170

(22) Filed: Oct. 5, 1999

(30) Foreign Application Priority Data

Jan. 12, 1999 (DE) .......................................... 99100472

(51) Int. Cl.[7] .............................. G06F 7/00; G06F 9/46
(52) U.S. Cl. ..................... 707/10; 707/103 R; 709/228; 709/230
(58) Field of Search ............................. 707/10, 103 R, 707/103 Y, 103 Z; 709/217–219, 203, 202, 311–313, 328, 330–331, 228, 230, 310, 312, 315–318

(56) References Cited

U.S. PATENT DOCUMENTS 6,125,383 A * 9/2000 Glynias et al. ............. 709/202
6,134,603 A * 10/2000 Jones et al. ................. 709/330
6,199,194 B1 * 5/2001 Wang et al. ................... 717/1

OTHER PUBLICATIONS

"Remote Procedure Calls and Java Remote Method Invocation," Jim Waldo, Sun Microsystems, IEEE Concurrency, vol. 6, No. 3, pp. 5–7, Jul . 1998.*

"Implementing Protocols in Java: The Price of Portability," Bobby Krupczak et al., INFOCOM '98, vol. 2, pp. 765–773, IEEE 98CH36169, Mar. 1998.*

* cited by examiner

*Primary Examiner*—Hosain T. Alam
(74) *Attorney, Agent, or Firm*—A. Bruce Clay; Carstens, Yee & Cahoon

(57) ABSTRACT

Java methods contained in a Java class and method database are accessed by a non-Java application running on a local machine or a remote machine. The non-Java application generates a standard TCP/IP communication call for a method of a Java class in the database. A Java service server running on a Java VM on the local machine receives the method call and related parameter data and performs their processing including a conversion of the call and of related parameter data from a transport format into Java native data types. The converted data is used for invoking a Java method for execution by applying the method to the converted parameter data. The result data of the method execution is converted from the Java format into the transport format in which they are transmitted to the non-Java application.

20 Claims, 3 Drawing Sheets

METHOD AND SYSTEM FOR ACCESSING JAVA APPLICATIONS

FIELD OF THE INVENTION

The invention relates to an apparatus for accessing Java methods contained in a Java class and method database by an application, the database being stored in a local computer and accessed by a server running in a Java environment on the local computer. The invention also relates to a process for accessing Java methods and a program product stored on a data carrier for controlling a computer to perform this process.

BACKGROUND OF THE INVENTION

Access to Java (trademark of Sun Microsystems, Inc.) methods by non-Java application programs requires programming against a detailed interface specification which must be known at implementation time. Furthermore, implementations of this type are specific to the interface for which they are programmed. Any interface change thus causes reprogramming effort. In addition, some programming environments do not support Java access and thus specific communication modules would have to be developed to overcome this barrier.

It is known to use distributed Java applications wherein programs running on a computer may invoke methods of Java objects which reside on another computer. Such remote use is permitted by the Remote Method Invocation (RMI) interface as described in the book "JAVA RMI: Remote Method Invocation", T. B. Downing, IDG Books, 1998, ISBN 0-7645-8043-4.

SUMMARY OF THE INVENTION

It is an object of the invention to allow access to Java methods by non-Java applications in a more effective manner requiring less programming effort. It is also an object of the invention to provide means which allow the use of a simple interface for a remote invocation of Java methods by non-Java applications through a data communication network.

According to the invention, as defined in the claims, a non-Java application generates a standard TCP/IP communication call for a method of a Java class in a Java class and method database. A Java service server receives requests for method calls and processes these requests including conversion of the method call and related parameter data from a transport format into Java native data types. The converted data is used for invoking a Java method which then executes by applying the method to the converted parameter data. The resulting data of the method execution is converted from the Java format into the transport format in which it is transmitted to the non-Java application.

TCP/IP is well established as a standard means for communication within all IT environments. The present invention provides access to Java applications via TCP/IP communication. The application programmer only needs to program against standard TCP/IP communication calls. For the purpose of performing the communication on the Java side a Java service server is started. This server creates an instance of the class to be accessed and provides an interface to native data types which may be used to call Java methods within an instantiated class.

The basic communication between the non-Java client and the Java server module is text based and, as such, is independent from machine and operating system specifics. The server also supports transmission of help information.

By using TCP/IP communication calls for the invocation of Java methods, the interface between the non-Java application and native Java data types is kept extremely simple. This approach makes it possible to create a link between applications written in low-end programming languages like Shellscript, pearl, C or Visual Basic and Java applications. The server can be used by a remote non-Java application through a network such as the Internet.

The interface which is provided by the server is fully configurable and driven by a configuration file. The configuration file can be created with the information provided by the JavaDoc files of the code to be accessed.

BRIEF DESCRIPTION OF THE DRAWINGS

In the following, implementations of the invention are described with reference to drawings which show.

DETAILED DESCRIPTION OF THE PREFERRED EMBODIMENT

Figure 1:
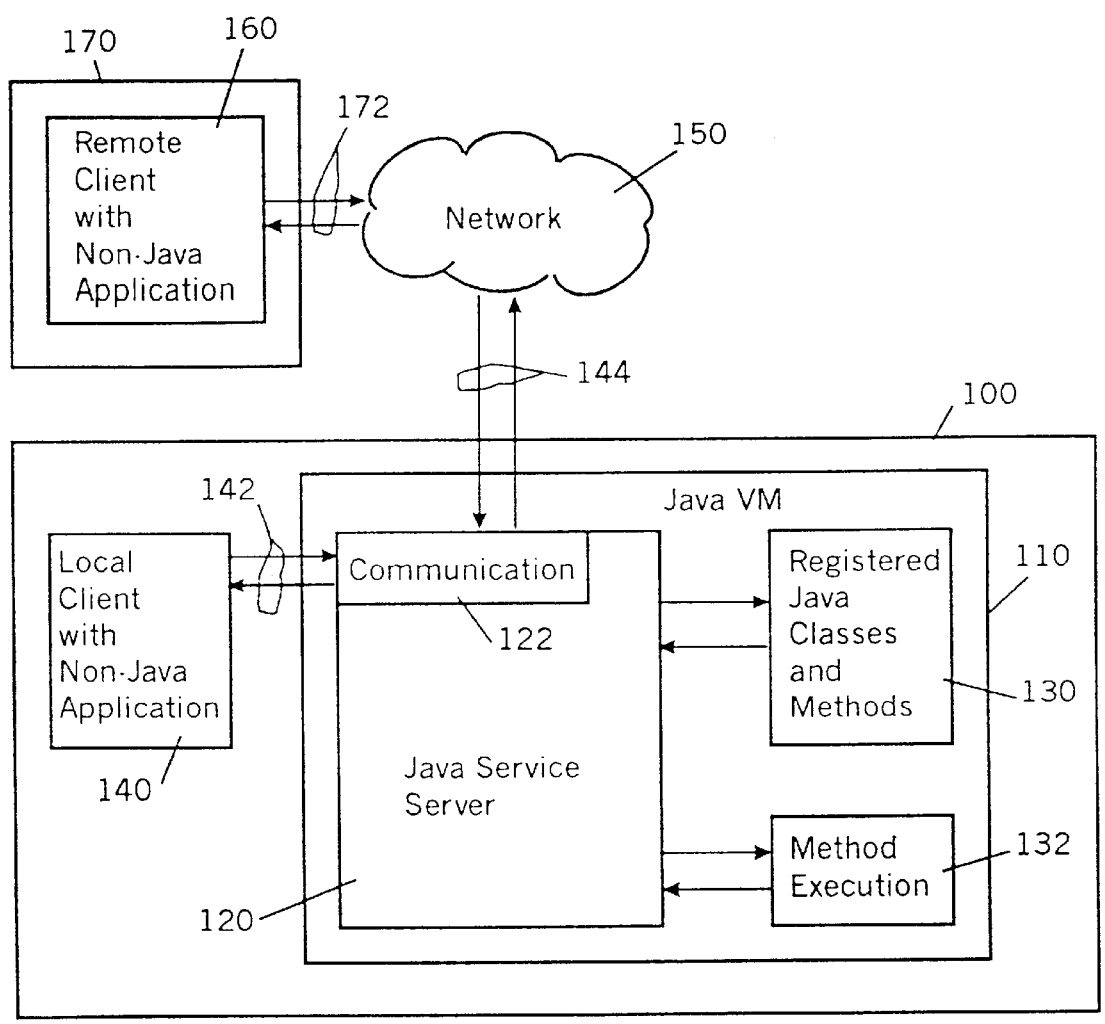
FIG. 1 is a schematic block diagram of a system using a proxy server integrated into a network for accessing smart cards according to an embodiment of the invention described herein.

FIG. 1 shows a Java virtual machine (Java VM) 110 which comprises the Java interpreter and the Java runtime system and which is on a local computer 100 installed along with other application programs. The Java virtual machine 110 comprises a Java service server (JSS) 120 which is an application program running on the Java VM 110. The Java virtual machine 110 further comprises a database 130 containing a plurality of registered Java classes and methods. Herein the term "method" has the meaning as generally used in the object oriented technology, i.e. to represent a set of functions or operation. The Java classes contained in the database 130 are collections of data and of methods which work with that data. Each class is assigned to an area of application. The methods contained in the database 130 define operations which may be executed on data of a class. For example, a class may be designated "circle" and its methods perform the necessary to draw a circle on the screen of a display device. Each of the methods is assigned to a class where each class may have a plurality of methods. The methods may be class methods, also designated as static methods, which can be called without an instantiation by a reference to that class and within that class by its name, or they may be object methods which are called after an object has been instantiated from the referenced class. The Java VM 110 also comprises a method execution component 132 which is used to perform the methods invoked from the database 130.

The Java service server 120 provides support to a local client 140 which is a non-Java application program running on the local computer 100. For this purpose the client 140 is linked to a communication component 122 of the Java service server 120 by means of an operational interconnection 142. The communication component 122 is also connected through a communication channel 144 and a network 150, such as the Internet, to a remote client 160 which may be a non-Java application program running on a workstation 170 connected to the network by a communication channel 172. The non-Java applications may comprise application programs which are, for instance, written in the programming languages C or Visual Basic. These programs make use of the Java methods in the database 130 by issuing, during runtime, calls to such methods and sending them as requests to the Java service server 120. The application programs also send to the server 120 data related to the calls and to which the methods called are to be applied. The Java VM 120 invokes the requested Java methods from database 130 and executes them by using the related data, and after completion of the processing, submits the result through the server 120 back to the client application.

Figure 2:
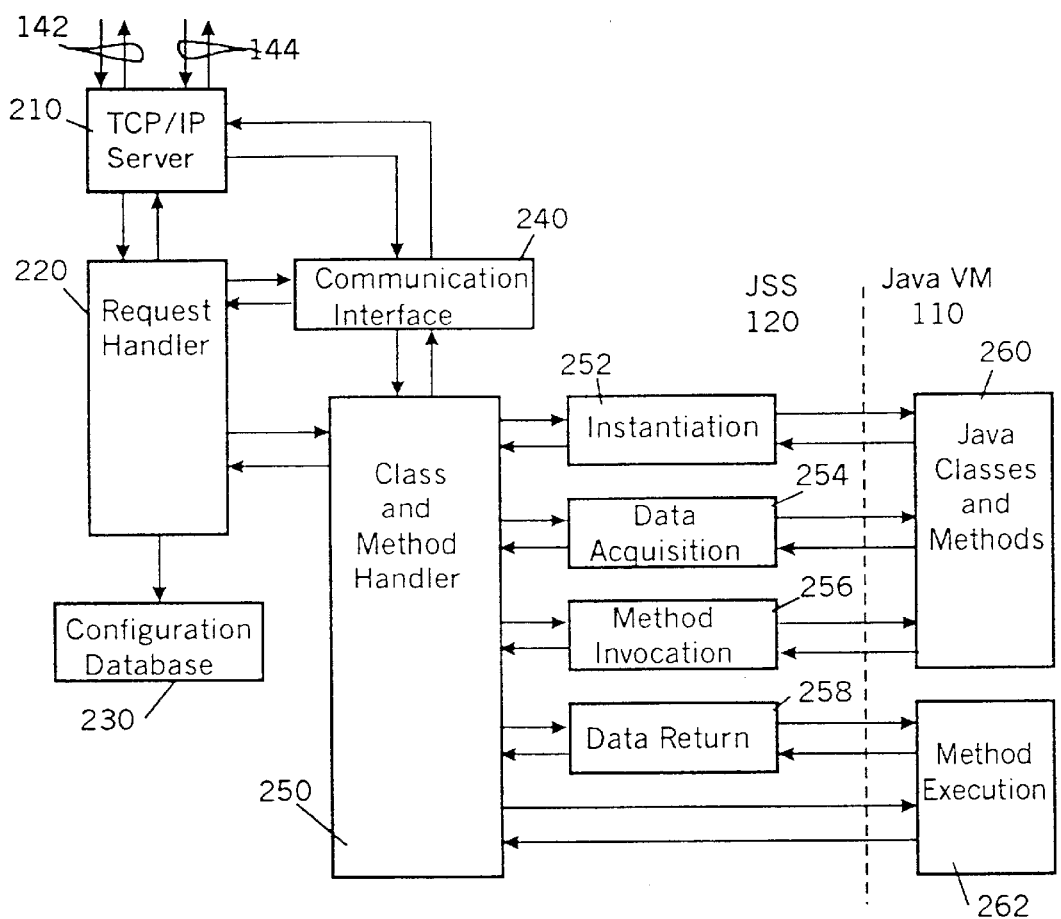
FIG. 2 is a schematic block diagram of the proxy server used in the system shown in FIG. 1.

FIG. 2 shows the components of a schematic block diagram of an implementation of the Java service server 120. The implementation comprises a TCP/IP server 210 which corresponds to the communication component 122 of FIG. 1 and fulfills the TCP (Transmission Control Protocol) and the IP (Internet Protocol) communication protocol standard. The TCP/IP server 210 receives requests via communication channels 142 and 144 and issues a greeting message to the requesting client 140 or 160. The TCP/IP server 210 performs a user name and password verification of the request and, after having successfully established a connection to the requesting client, starts a request handler component 220 for processing the request received from client 140 or 160. Each of the requests received includes a call to a method in the database 130.

The request handler component 220 performs some preparatory operations necessary for processing a request. The operations include initiating a configuration of the Java service server 120 by means of a configuration database 230 which holds all information the program needs to operate. It also contains information necessary for the instantiation process, as well as references to all system messages. It further contains help messages which by means of the request handler 220 and the TCP/IP server 210 are made available on request to the client 140 or 160. The configuration of the JSS 120 depends upon, among others, certain client parameters such as the programming language and the data types used by the client application. After the configuration has been completed, the request handler component 220 initiates a conversion of the call from a transport format into native Java datatypes. The conversions are performed by the use of a communication interface component 240. Except for the case of calling a class method or static method, the request handler component 220 starts via a class and method handler component 250 an instantiation component 252, which accesses the Java class specified in the request and generates an instantiation of the specified class. This class is contained as one of a plurality of Java classes in a database 260 which corresponds to the database 130 of FIG. 1. If the call is directed to a class method or static method, access to the corresponding method in the database 260 is performed without an instantiation of the class referenced by the call.

The request handler component 220 asks the requesting client 140 or 160 for parameter data related to the call. The parameter data specifies a target method to be executed and includes the data to which the target method has to be applied. TCP/IP server 210 receives the message from the client, and the request handler 220 initiates a conversion of the data from the TCP/IP transport format into native Java datatypes. A data acquisition component 254 builds a Java object from the instantiated Java class by using the specification of the target method and the client data to be processed, and a method invocation component 256 invokes the target method in the object. The invoked object is submitted to the method handler 250 which starts the method execution component 262 of the Java VM 110 to execute the target method using the converted client data.

On completion of the method operation, a data return component 258 directs the result of the method execution to the request handler 220 which converts the resulting data to the transport format and sends it to the client 140 or 160 which issued the call. If the call came from the local client 140, the converted results are submitted by means of the TCP/IP server 210 to the client application corresponding thereto. If the call came from the remote client 160, the converted results are transmitted through TCP/IP server 210 and the network 150 to the client application corresponding thereto.

In summary, every time a method call is made to server 120 it responds by indicating the return datatype, the number of parameters and the datatypes to be used for the input parameters. The client communicates the length of each input field and sends the corresponding parameter data in text format. The server converts the text data to the required Java datatypes and invokes the Java method being requested. After execution of the method by the Java VM is completed, the server converts the result to the TCP/IP text format and sends it back to the client as described above.

The interface that is provided by the server 120 is fully configurable and maintained by a configuration file stored in the configuration database 230. This file can be created with information provided by the JavaDoc tool of the code to be accessed. For more complex interfaces, i.e. support of non-native Java datatype objects, it is possible to use wrapper classes in Java.

Figure 3:
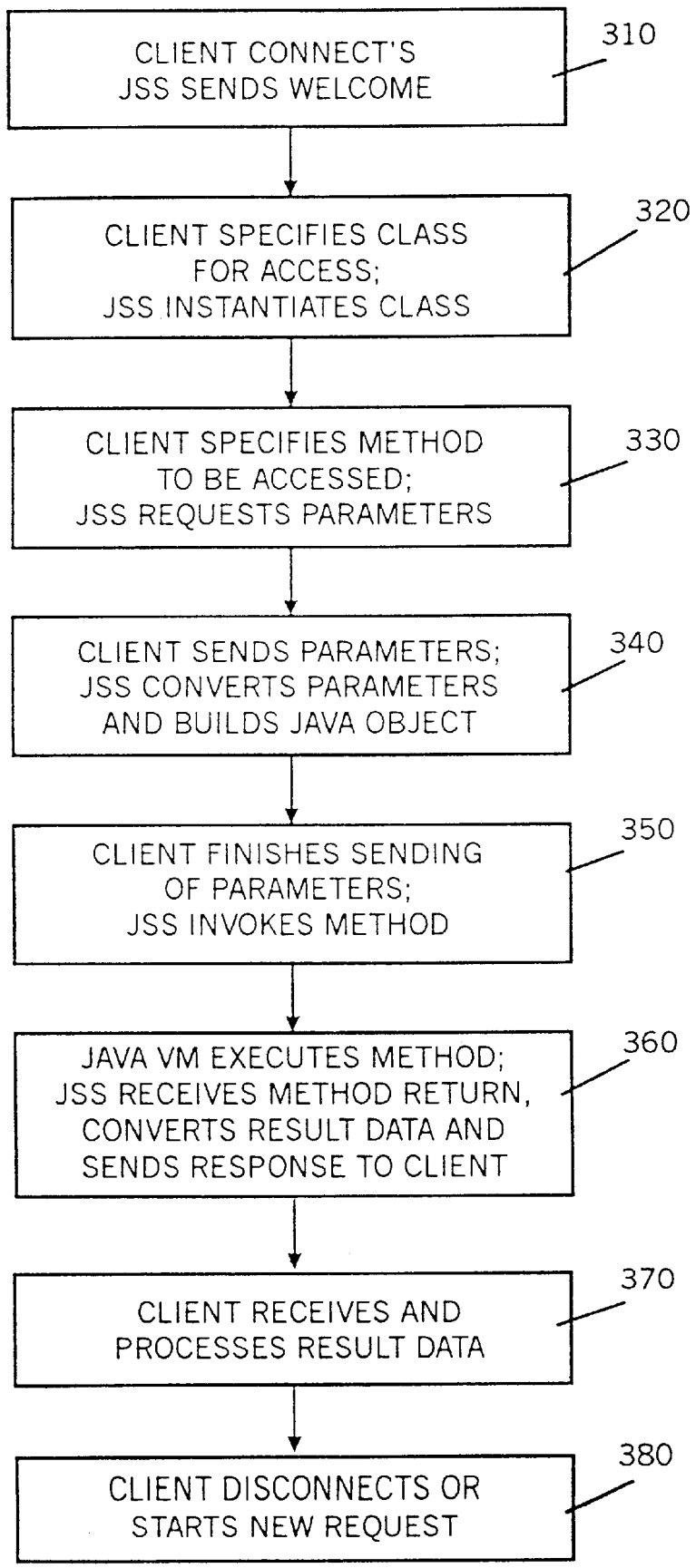
FIG. 3 is a schematic flow diagram of steps according to a process implementation of the present invention

The steps of the Java application accessing and execution process are now described with reference to FIG. 3. The process relates to the use of object methods which are accessible after an instantiation of a specified Java class. In step 310 a request from a client is received and the client is connected to the Java service server 120 which sends a welcome message to the client. In step 320 the client specifies a Java class to be accessed and the server 120 performs an instantiation of that class. In step 330 the client specifies the method to be invoked and the server 120 asks for the parameter data which are to be processed by the specified method. In step 340 the client sends parameter data to the server 120 which builds a Java object by using the converted parameter data. In step 350 sending of parameter data is finished and server 120 invokes the target method. By step 360 the Java VM executes the target method. The server 120 receives the method return data which are evaluated, converted to the transport format and sent to the client application. In step 370 the client receives the response and processes it in performing its application program. By step 380 the client terminates its connection to the server 120 or starts a new request.

Subsequently, a sample communication between a client and the server is described:

FIRST EXAMPLE

The client initiates the connection to the server. The server may respond with a welcome message:

>"200 JavaServiceServer (C)IBM 1998 READY."

The client requests the method it wants to access:

<"initialize"

The method initialize is a method with the definition (void) initialize(void). The server sends the answer to the call back:

>"200 Method successfully invoked—no return."

This is a simple form to invoke a method. More complicated is the invocation if it is necessary to transport additional data from and to the application.

SECOND EXAMPLE

In this example the invoked method needs two strings and returns an integer.
Again the method is called:
<"verify"
The server responds with the needed datatypes:
>"400 (int)verify(String,String)"
The client has to communicate to the server how much data it will send:
>"10 10"
The server acknowledges:
>"200 OK. Begin sending data now."
The server sends a data packet with both information fields:
<"HELLOWWORLDHELLOWWORLD"
The client returns that the sent data was correct and responds by sending return data:
>"200 Method successfully invoked—sending return."
>"2"
>"20"
The server 120 acknowledges the request and indicates that it will return two bytes of data and then sends the two bytes of data. The definition of the data field is applied to the received data and the application 140 or 160 can now use its own representation for the received value.

While the invention is described with reference to a preferred implementation of the invention, modifications or other embodiments of the invention are within the scope of the invention as defined in the claims.

What is claimed is:

1. An apparatus for accessing Java methods contained in a Java class and method database by an application, the database being stored in a local computer and accessed by a server running in a Java Environment on the local computer, comprising:
   (a) non-Java application means for generating a standard TCP/IP communication call for a method of a Java class in the database;
   (b) means for receiving said call and related parameter data from said means for generating;
   (c) means for converting said call and said related parameter data from said means for generating from a transport format into Java native data types;
   (d) means for invoking said method of a Java class and for executing it by using said converted parameter data;
   (e) means for generating a response to the application by converting data resulting from said means for executing from Java format into a transport format; and
   (f) means for submitting the converted result data to the non-Java application means for generating.

2. The apparatus according to claim 1, comprising TCP/IP server means for receiving said call and said parameter data from the application and for transmitting said result data to the application.

3. The apparatus according to claim 1, further comprising means for creating an instance of the Java class specified in said call which includes a method to be called.

4. The apparatus according to claim 3, further comprising means for generating, from an instantiated class, an object which includes the method to be accessed by said means for invoking.

5. The apparatus according to claim 1, comprising a Java service server, which is an application running on a Java virtual machine on the local computer, for performing access to a method in the database and for executing said method with data received from the non-Java application means for generating, wherein said Java service server includes said means for receiving.

6. The apparatus according to claim 5, wherein the Java service server comprises an interface for translating method calls and related data parameters from a transport format into a Java format, and for translating method execution result data from a Java format into a transport format.

7. The apparatus according to claim 5, wherein the Java service server performs transmission of help messages to the application.

8. The apparatus according to claim 7, wherein a non-Java application is installed on a remote computer which is connected through a data communication network to said means for receiving.

9. A process for accessing Java methods contained in a Java class and method database by an application, the database being stored in a local computer and accessed by a server running in a Java environment on the local computer, characterized by the steps of:
   (a) generating by a non-Java application a standard TCP/IP communication call for a method of a Java class in the database;
   (b) receiving said call and related parameter data from the application;
   (c) converting said call and related parameter data from a transport format into Java native data types;
   (d) invoking said method of a Java class for execution by using said converted parameter data;
   (e) generating a response to the application by converting the result data of the method execution into a transport format; and
   (f) submitting the converted result to the non-Java application.

10. The process according to claim 9, comprising the step (d1) of creating an instance of the Java class specified in said call and including the method to be called.

11. The process according to claim 10, comprising the step (d2) of generating from an instantiated class an object which includes the method to be accessed by said step of invoking.

12. The process according to claim 11, wherein step (a) is performed during the runtime of the application.

13. The process according to claim 9, comprising the step of transmitting help messages to said application.

14. The process according to claim 13, wherein said method call and the related parameters are transmitted to said receiving step (b) from an application installed on a remote computer through a data communication network.

15. A program product stored on a data carrier comprising computer readable means for accessing Java methods contained in a Java class and method database by an application, said database being stored in a local computer and accessed by a server running in a Java environment on said local computer, characterized by:
   (a) computer readable means for generating by a non-Java application a standard TCP/IP communication call for a method of a Java class in said database;
   (b) computer readable means for receiving said call and related parameter data from said application;
   (c) computer readable means for converting said method call and related parameter data from a transport format into Java native data types;

(d) computer readable means for invoking said Java method for execution using said converted parameter data;

(e) computer readable means for generating a response to the client application by converting the result data of the method execution into a transport format; and (f) computer readable means for submitting the converted result to the non-Java application.

16. The program product according to claim 15, further comprising computer readable means for creating (d1) an instance of the Java class specified in said call and including the method to be called.

17. The program product according to claim 16, further comprising computer readable means for generating (d2) from an instantiated class an object which includes the method to be accessed by said computer readable means for invoking.

18. The program product according to claim 17, wherein said computer readable means (a) is performed during runtime of the application.

19. The program product according to claim 15, further comprising computer readable means for transmitting help messages to said application.

20. The program product according to claim 19, wherein said method call and the related parameters are transmitted to said computer readable means for receiving (b) from an application installed on a remote computer through a data communication network.

* * * * *